INVENTOR
Antony Charles Teago
By Dicke & Craig
ATTORNEYS

INVENTOR
Antony Charles Teago
By Dicke + Craig
ATTORNEYS

FIG. 6.

United States Patent Office 3,232,410
Patented Feb. 1, 1966

3,232,410
MECHANICAL HANDLING APPARATUS
Antony Charles Teago, Crawley, England, assignor to Woodfield Bennett Ltd., Kent, England, a British company
Filed Oct. 30, 1962, Ser. No. 234,054
Claims priority, application Great Britain, Oct. 31, 1961, 38,920/61
7 Claims. (Cl. 198—21)

This invention is concerned with mechanical handling apparatus and has particular application to the handling of bricks.

There is known apparatus for handling articles which is particularly applicable to the brick trade and which enables articles to be stacked in any predeterminable pattern. In that machine bricks are delivered on a conveyor to a pick up station wherein they are grasped and then carried away to be built up in a particular pattern. It is convenient for some applications, that the disposition of the bricks at the pick up station should be preorientated.

A particular object of the present invention is the provision of apparatus for the handling of articles whereby articles can be transferred from one location to another and in the course of such transfer have their disposition changed.

In its broader aspect the invention provides mechanical handling apparatus for the transfer of articles from one conveyor belt to a second conveyor belt located above said first belt and travelling transverse to it, which apparatus comprises a pick up head for the articles mounted on a cranked arm for movement from a position in which it lies in the path of articles carried by said first conveyor to a position in which it lies above the second belt with an article held on it and a second pick up head located above the second belt and movable vertically thereabove arranged to pick up the article from the first pick up head when the latter is located above the second belt and hold the article during retraction of the first pick up head to its original position and thereafter deposit the article on the second belt.

It will be appreciated that during the transfer from the first to the second belts, the articles are turned exactly through 90°.

According to a feature of the invention further pick up means may be provided for handling another article, said auxiliary means also being located in the path of articles on the first conveyor but on the other side of the second conveyor and being adapted to pick up articles from the first conveyor and deposit them on the second conveyor the articles also being turned through 90° during transfer but said turning movement being in the opposite direction.

According to a particular embodiment of the invention, the apparatus is for the handling of bricks which are carried on the first conveyor with their treated stretcher faces uppermost, the further pick up means picking up the first of a pair of bricks and the main pick up means the second. by the apparatus of the invention the bricks are deposited on the second belt with their treated stretcher faces opposed to each other.

Preferably the pick up means are vacuum operated and may advantageously be of the type described and claimed in my copending application Serial No. 234,199 filed October 30, 1962, now abandoned.

An embodiment of the invention will be described with reference to the accompanying drawings in which.

Bricks 111, with their stretcher faces uppermost are delivered from the cutting table of a brick making machine on an endless conveyor 112. The bricks are spaced apart on the conveyor by means of accelerating means (not shown) for the conveyor. Located above the conveyor 112 and running transverse to it is a second conveyor 113 for delivering bricks away from the present machine for example to the pick up station of a brick handling machine.

Figure 2:
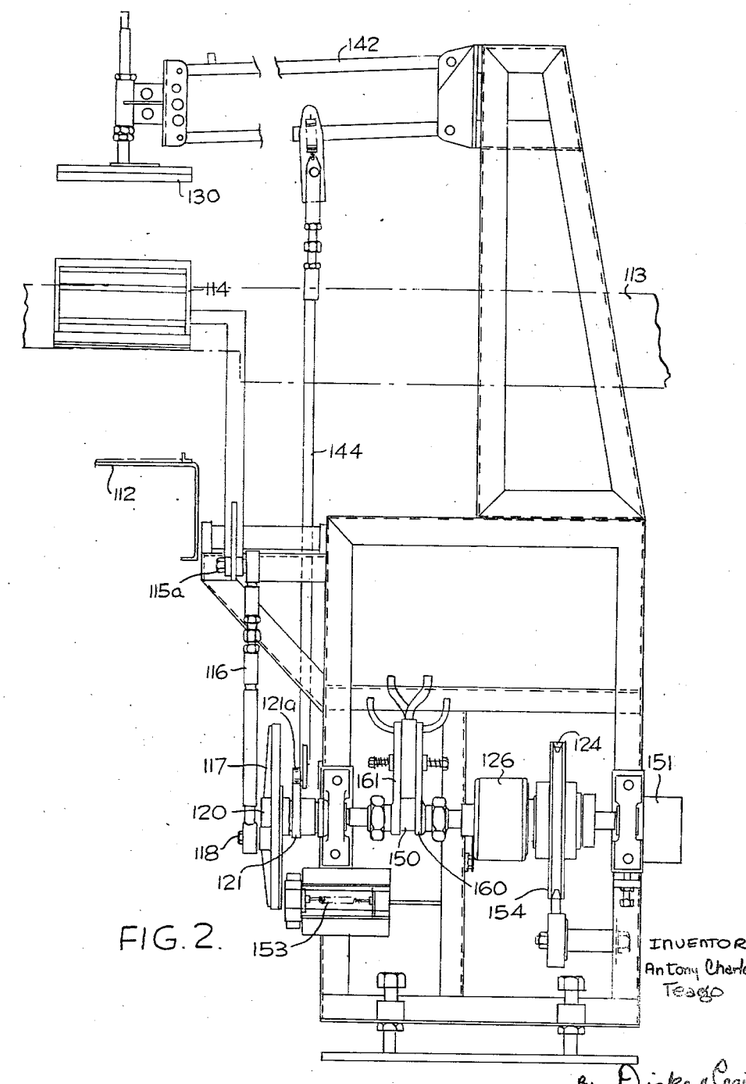
FIGURE 2 is a side elevation of the machine shown in FIGURE 1.
Figure 3:
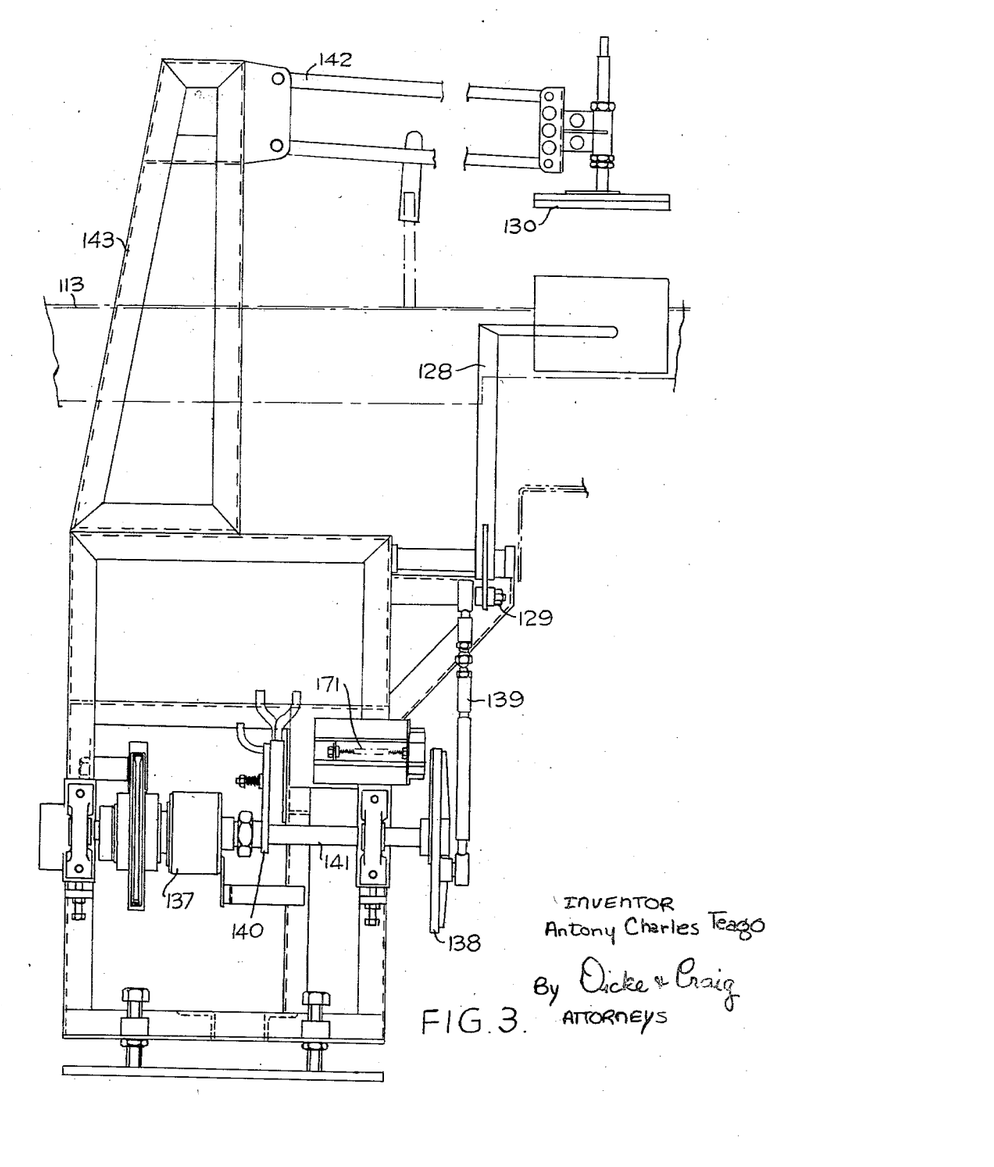
FIGURE 3 is a side elevation of the machine shown in FIGURE 1 from the other side.
Figure 4:
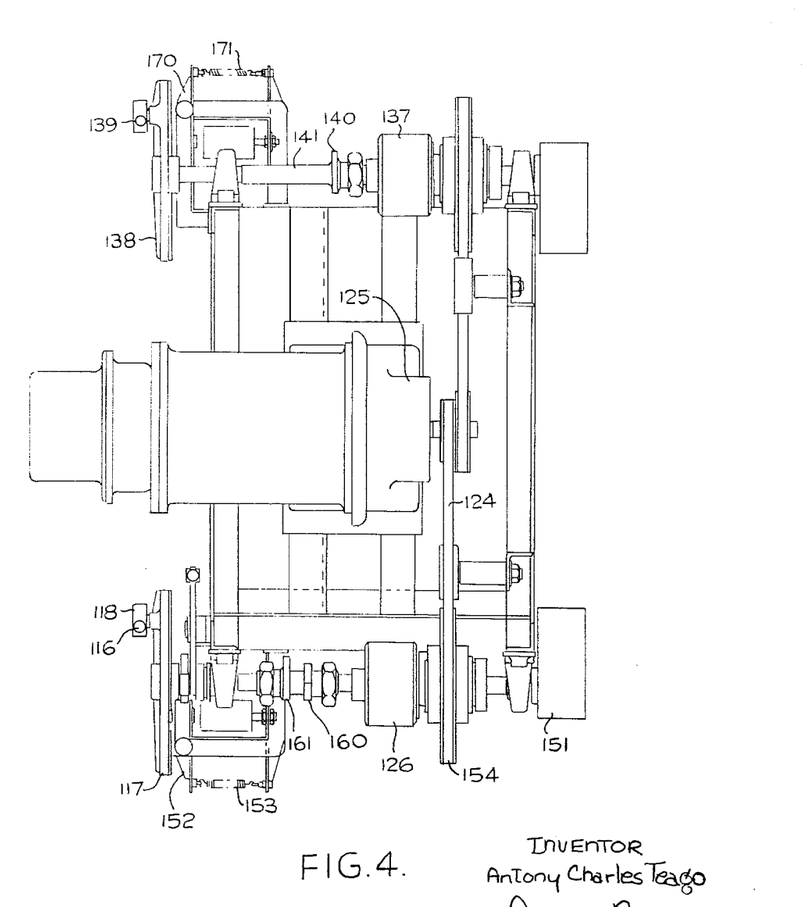
FIGURE 4 is a plan view of the machine shown in FIGURE 1.

A vacuum pick up head 114 is mounted on a cranked arm 115 pivoted at 115a which is actuated by a connecting rod 116 connected to a driving wheel 117. The connecting rod is connected to a crank pin 118. The wheel 117 is mounted on a shaft 120 which carries a slip ring assembly 151 as diagrammatically illustrated in FIGURE 2, a cam 121 for the purpose hereinafter described, a magnetic clutch 126, cams 160 and 161 for operating valves 150 for the vacuum supply to the pick up heads 114 and 130 and a driven pulley 154.

The pulley 154 which carries an electromagnetic clutch 126 is rotated by a belt 124 driven by an electric motor 125.

A second pick up head 127 is provided on the other side of the transverse conveyor 113. This head is carried by a cranked arm 128 pivoted at 129 and actuated independently of the arm 115 by the motor 125, through a similar electromagnetic clutch 137.

Located above the conveyor 113 is a third pick up head 130 which is articulated to the general framework of the machine for limited movement in a vertical direction. The head 130 is carried by a parallel linkage 142 mounted on the machine framework 143 and actuated by a connecting rod 144 carrying a cam follower 121a which engages cam 121.

Figure 1:
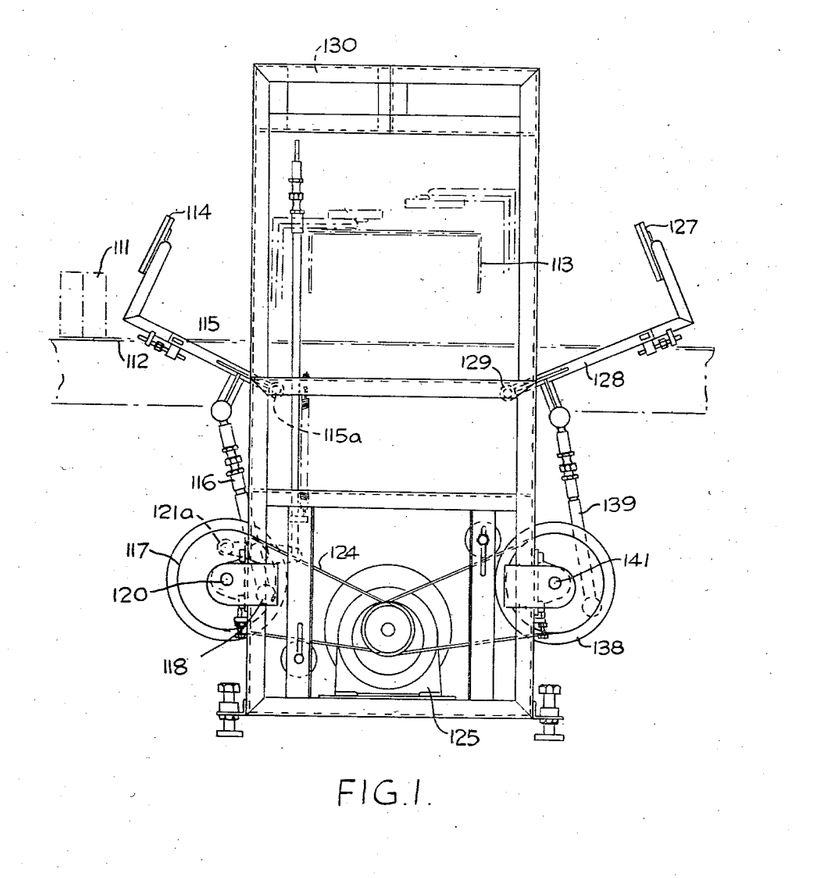
FIGURE 1 is a front elevation of a machine for transferring bricks from one conveyor to another.

The operation of the machine is as follows:

In the starting (stop) position the pick up head 114 is in the position shown in full lines in FIGURE 1. The bricks pass through a measuring and selection station which as will hereafter be described with reference to FIGURES 5 and 6 initiates the start of the cycle.

A latch 152, spring loaded by spring 153 which engages a stop plate on the face of wheel 117 is retracted to free the wheel.

Thereafter the magnetic clutch 126 is energised and drive is imparted to the wheel 117 bringing the arm 115 to a horizontal position, where it engages the selected brick. Engagement of the head with the brick causes vacuum to be applied and the clutch operated by means hereinafter described and the arm 115 is moved to the position shown in dot and dash lines. At this stage the pick up head 130 is lowered slightly by cam action to engage the brick held on the head 114. Vacuum is applied to the head 130 by engagement with the brick and that to the head 114 is cut off by the cam 160. The head 130 is then slightly raised under cam action and the arm 115 is retracted to the start position, where it is ready for further operation. After the start of the retraction the head 130 is lowered again under cam action. Vacuum to the head 130 is cut off by the cam 161 and the brick dropped onto the conveyor 113 with its treated face disposed inwardly, the head 130 then returning to its original position, again under cam action, fully raised above the conveyor 113.

A brick passing to pick up head 127 passes through a selection station which gives a signal as hereafter described to initiate the start of a cycle for the second pick up head 127. A latch 170 spring loaded by spring 171 which engages a stop on the face of wheel 138 is released in a similar manner to that already described in connection with the pick up head 114, and thereafter the electromagnetic clutch 137 is energised. This causes drive from motor 125 to be imparted to wheel 138 carrying a connecting rod 139 connected to the arm 128, which is driven to the vertical position shown in dot and dash lines where it is stopped by re-engagement under spring action of the latch 170 and the clutch 137 is de-energised. The vacuum is cut off by cam 140 on the shaft 141 of wheel 138 and the brick is dropped onto conveyor 113, with its treated face disposed inwardly i.e. opposed to the treated face of the brick dropped by head 130. The arm 128 is then returned to its start position ready for further operation.

The movement of the heads 114 and 127 are interlocked in such a way that the head 127 cannot be operated until the head 114 has been operated.

The construction of the pick up heads is as described in my aforesaid copending application and will not be described herein in detail.

The control of the machine will now be described with reference to FIGURES 5, 6 and 6A.

Figure 5:
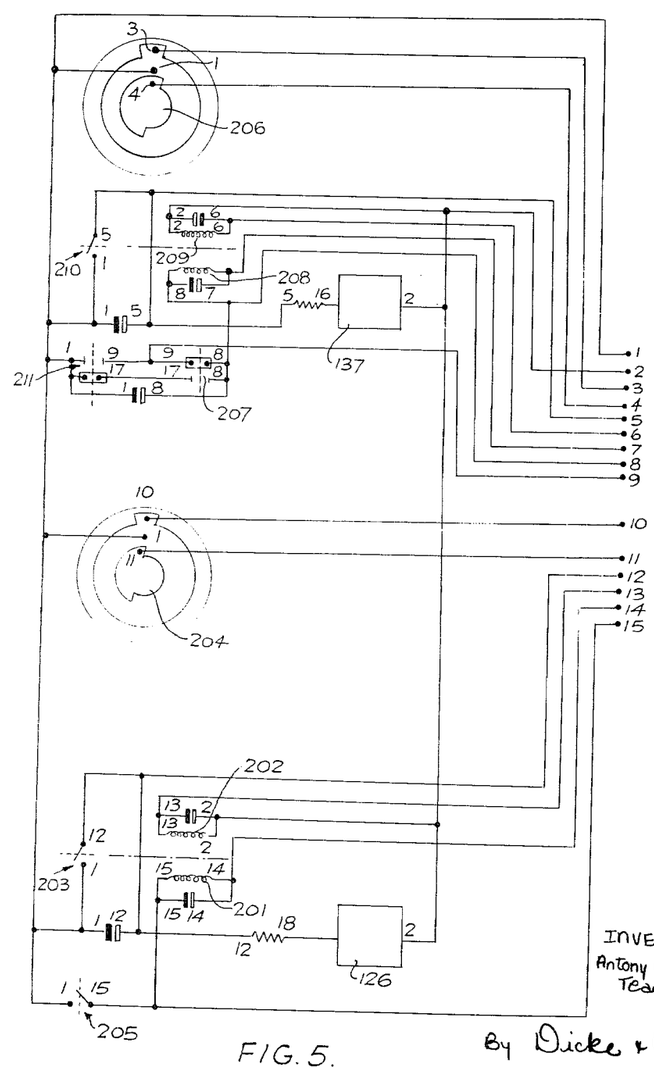
FIGURE 5 is a circuit diagram illustrating the method of controlling the machine.
Figure 6:
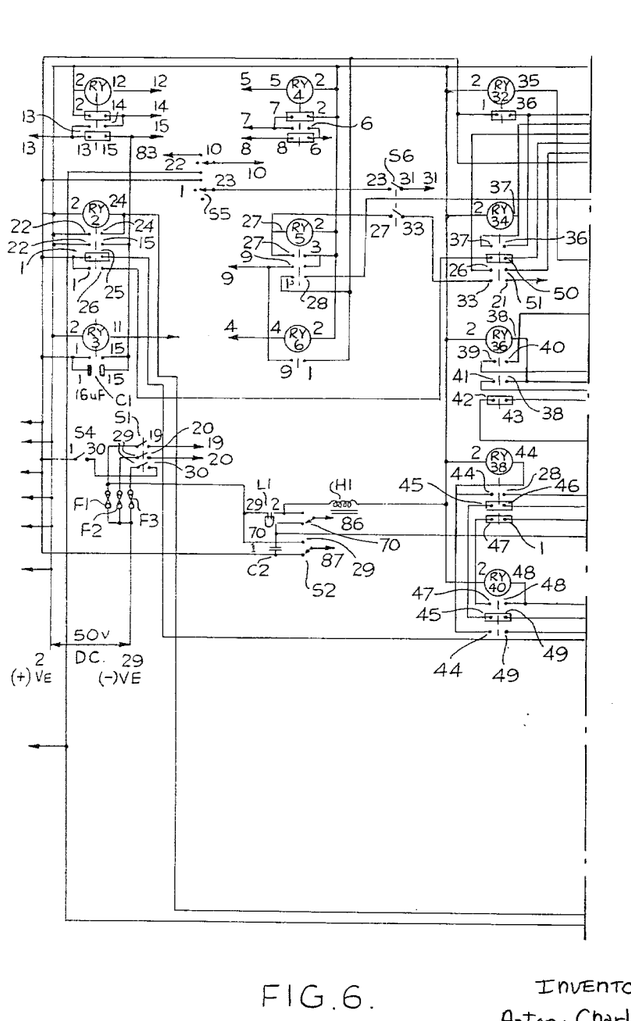
FIGURES 6 and 6A represent a circuit diagram illustrating the arrangement of relays.
Figure 6A:
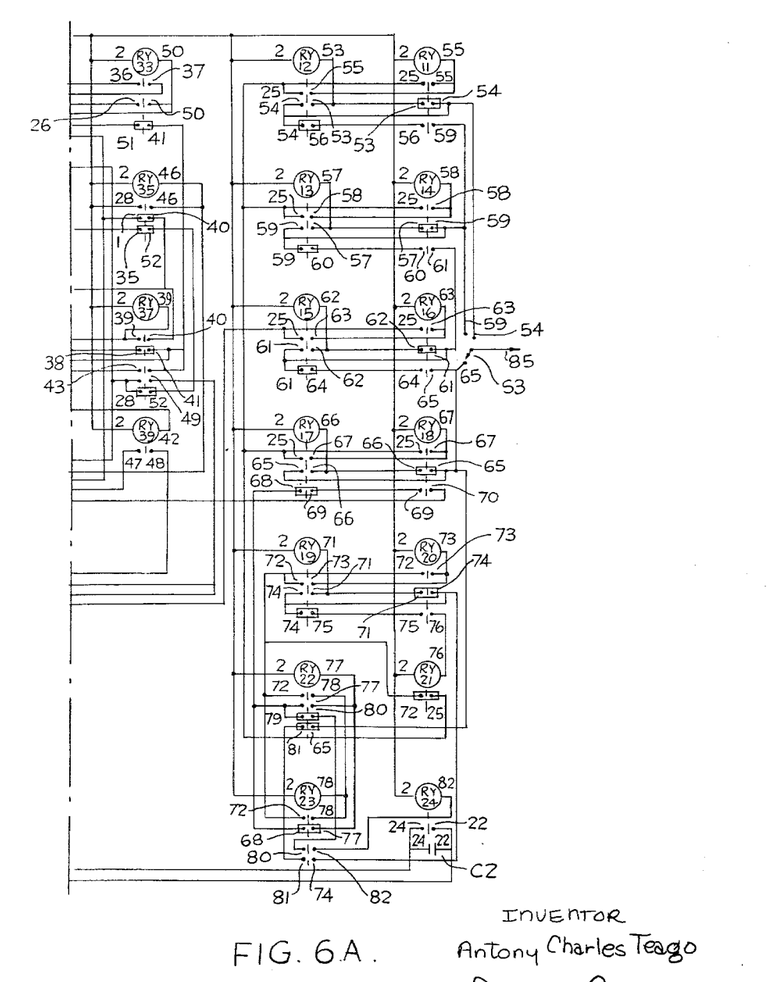

FIGURE 5 is a circuit diagram of the machine circuit and FIGURE 6 is a circuit diagram of the machine relay control circuit. The circuit of FIGURE 6 may be considered in four basic sections as follows:

First pick up head 114, relays RY 1, 2 and 3;
Second pick up head 127, relays RY 4, 5 and 6;
Selection relays RY 11 to 24;
Memory relays RY 32 to 40.

The operation of the memory and selection relays is described in the specification of British patent application No. 14,209/62 and will not be described in detail in the present specification, reference to these two sections only being made where it is necessary for a ready understanding of the present invention.

Furthermore in FIGURE 6 there are shown a number of components e.g. fuses F1, 2 and 3, capacitors C1 and C2, coil H1 and lamp L1 whose presence in the circuit will be clear to those skilled in the art and which accordingly will not be further described.

As drawn the circuits are in the de-energised condition with both pick-up heads in the start position and both vacuum valves mechanically positioned connecting the heads to vacuum.

The following are the various stages of operation:

*Hand switch conditions for automatic operation*

Switch S₁—"Closed" i.e. supply available to switch S₄.
Switch S₂—"Run" i.e. completing the circuit for external signals received from the measuring and selection station and to the counting relays.
Switch S₃—This receives an external signal from the measuring and selection station and must be set to the desired counting sequence of bricks to be taken by the machine.
Switch S₄—"Closed" i.e. supply available to the machine and control relays.
Switch S₅—"Auto" i.e. supply from the machine on wire No. 10 available on wire No. 83, through remote switching positions which are "normally closed" to wire No. 22.
Switch S₆—"Closed" i.e. connecting relay RY 5 to the memory relay RY 34.

*Sequence of operations for the first pick up head 114*

Depending on the position switch S₃, when the correct number of external signals from the measuring and selection station has been received on wires Nos. 70 and 85 counting relay RY 24 will become energised for the duration of the external signal. Through normally open contacts relay RY 24 applies current to wire No. 24 and relay RY 2 is energised. Relay RY 2 locks itself in the energised position by connecting wire No. 24 to wire No. 22. Wire No. 22 is also connected to wire No. 15 which directly energises one latch coil 201 and through normally closed contacts on relay RY 1 puts supply on wire No. 13 which directly energises the other latch coil 202 and thus both latch coils are energised in parallel.

Movement of the latch stop due to the coils being energised operates the latch switch 203 and through wires Nos. 12 and 18 magnetic clutch 126 is energised thus driving the machine wire No. 12 also energises relay RY 1 and thus disconnects wire No. 13 from wire No. 15 and instead connects it to wire No. 14. This arrangement puts the two latch coils in series.

The drive through the magnetic clutch moves the pick up head from the start position to the pick up position and rotates contact cam 204 such that the current from wire No. 1 to wire No. 10 is disconnected. This removes the current from wire No. 83 and through the remote switching positions from wire No. 22 and thus relay RY 2 and both latch coils are de-energised. As the latch coils are de-energised the latch switch is released and both relay RY 1 and the magnetic clutch are de-energised and thus the drive removed.

Next when the selected brick strikes the pickup head the brick operates a small vacuum valve and as the brick is drawn onto the pick-up head the head switch 205 is operated. This puts current on to wire No. 15 and as previously described causes the latch stop to be removed and the drive applied.

When the pick up head has reached the apex of its arc of movement the vacuum will have been removed by a mechanical movement of the vacuum valve under cam action and by another mechanical action also under cam action the brick is transferred to the pick up head 130. In this position, due to the rotation of the contact cam 204 wire No. 11 is receiving a current from wire No. 1 and relay RY 3 is energised. Although the head switch has now been released due to the removal of the brick, wire No. 15 now receives a current through the normally open contacts on relay RY 3 and the drive continues until, due to the rotation of the contact cam, wire No. 11 is disconnected and thus relay RY 3, the latch coils and the magnetic clutch are de-energised.

Due to the spring return action of the latch stop when the pick up head arrives at the start position it will be held until relay RY 24 is again energised.

*Sequence of operations for the second pick up head 127*

This pick up head can only be operated providing the pick up head 114 has been operated, i.e., relay RY 34 of the memory relays is energised.

When the selected brick passes the selection station for the second pick up head current is made available on wire No. 21 and through wires Nos. 33 and 27 relay RY 5 is energised for the duration of the signal.

Relay RY 5 locks itself in the energised position by connecting wire No. 27 to wire No. 3 which is receiving a current from wire No. 1 on contact cam 206. Wire No. 3 is also connected to wire No. 9 which through the normally closed contacts of top-dead-centre switch 207 puts current on wire No. 8 which directly energises one latch coil 208 and through normally closed contacts on relay RY 4 puts current on wire No. 6 which directly energises the other latch coil 209 and thus both latch coils are energised in parallel.

Movement of the latch stop due to the coils being energised operates latch switch 210 and through wires Nos. 5 and 16 the magnetic switch 137 is energised thus applying the drive. Wire No. 5 also energises relay RY 4 and thus disconnects wire No. 6 from wire No. 8 and instead connects it to wire No. 7. This arrangement puts the two latch coils in series.

The drive through the magnetic clutch moves the pick up head from the start position to the pick up position and rotates the contact cam 206 such that the current from wire No. 1 is disconnected from wire No. 3. This de-energises relay RY 5 and removes the current from wires Nos. 9 and 8 thus de-energising the latch coils. As the latch coils are de-energised the latch switch is released and both relay RY 4 and the magnetic clutch are de-energised and thus the drive is removed.

Next when the selected brick strikes the pick-up head the brick operates a small vacuum valve and as the brick is drawn on to the pick up head the head switch 211 is operated. This puts supply directly onto wire No. 9 and as previously described causes the latch stop to be removed and the drive applied.

As the pick up head approaches the apex of its arc of movement the top-dead-centre switch 207 is operated and disconnects wire No. 8 from wire No. 9 and thus the latch coils are de-energised. This releases the latch switch and de-energises the magnetic clutch and thus removes the drive.

Due to the spring return action of the latch stop, when the pick up head reaches the apex of its arc of movement it is locked in position and at practically the same instant the vacuum is removed mechanically by cam action and the brick is released. This movement releases the head switch 211 and through its normally closed contacts supply is put on wire No. 8 through wire No. 17 and the normally open contacts of the top-dead-centre switch 207. Again the latch coils are energised and the drive applied as previously described.

During the return arc of the pick up head the top-dead-centre switch 207 will be released but before this occurs wire No. 4 will be connected to wire No. 1 due to the tated such that wire No. 4 is disconnected, relay RY 6 is energised and through its normally open contacts wire No. 9 is connected to wire No. 1 and the latch coils and clutch remain energised. When the contact cam has rotated such that wire No. 4 is disconnected relay RY 6 de-energised and thus the latch coils are de-energised. As the latch coils de-energise the latch switch is released and the magnetic clutch is de-energised thus removing the drive.

Due to the spring return action of the latch stop when the pick up head arrives at the start position it will be held until another signal is received through relay RY 34.

While I have shown and described one embodiment in accordance with the present invention, it is understood that the same is not limited thereto, but is susceptible of many changes and modifications within the spirit and scope thereof, and I therefore do not wish to be limited to the details shown and described herein but intend to cover all such changes and modifications as are encompassed by the scope of the appended claims.

I claim:
1. Article handling apparatus comprising a first conveyor belt, a second conveyor belt positioned above and travelling transverse to said first conveyor belt, a first pick up head supported upon cranked arm means adjacent one side of said second conveyor belt to enable movement from a first position for receiving articles carried by said first conveyor belt to a second position above said second conveyor belt, a second pick up head located above said second conveyor belt, and means to enable vertical movement of said second pick up head from said second position to a discharge position adjacent said second conveyor belt whereby said second pick up head receives an article from said first pick up head and deposits same upon said second conveyor belt.

2. Article handling apparatus comprising a first conveyor belt, a second conveyor belt positioned above and travelling transverse to said first conveyor belt, a first pick up head supported upon cranked arm means adjacent one side of said second conveyor belt to enable movement from a first position for receiving articles carried by said first conveyor belt to a second position above said second conveyor belt, a second pick up head located above said second conveyor belt, means to enable vertical movement of said second pick up head from said second position to a discharge position adjacent said second conveyor belt whereby said second pick up head receives an article from said first pick up head and deposits same upon said second conveyor belt, and a third pick up head provided with cranked arm means adjacent the other side of said second conveyor belt to enable additional articles upon said first conveyor belt to be grasped and deposited upon said second conveyor belt.

3. Article handling apparatus comprising a first conveyor belt, a second conveyor belt positioned above and travelling transverse to said first conveyor belt, a first pick up head supported upon cranked arm means adjacent one side of said second conveyor belt to enable movement from a first position for receiving articles carried by said first conveyor belt to a second position above said second conveyor belt, a second pick up head located above said second conveyor belt, means to enable vertical movement of said second pick up head from said second position to a discharge position adjacent said second conveyor belt whereby said second pick up head receives an article from said first pick up head and deposits same upon said second conveyor belt, and control means for sensing articles upon said first conveyor belt and thereupon initiating movement of said pick up heads.

4. Article handling apparatus comprising a first conveyor belt, a second conveyor belt positoned above and travelling transverse to said first conveyor belt, a first vacuum pick up head supported upon cranked arm means adjacent one side of said second conveyor belt to enable movement from a first position for receiving articles carried by said first conveyor belt to a second position above said second conveyor belt, a second vacuum pick up head located above said second conveyor belt, cam means for controlling the selective application of vacuum to said first and second pick-up heads, and means to enable vertical movement of said second pick up head from said second position to a discharge position adjacent said second conveyor belt whereby said second pick up head receives an article from said first pick up head and deposits same upon said second conveyor belt.

5. Brick handling apparatus comprising a first conveyor belt adapted to convey bricks with the treated stretcher faces thereof uppermost, a second conveyor belt positioned above and travelling transverse to said first conveyor belt, a first pick up head supported upon cranked arm means adjacent one side of said second conveyor belt to enable movement from a first position for receiving bricks carried by said first conveyor belt upwardly and through a forward arc of about 90° to a second position above said second conveyor belt, a second pick up head located above said second conveyor belt, means to enable vertical movement of said second pick up head from said second position to a discharge position adjacent said second conveyor belt whereby said second pick up head receives a brick from said first pick up head and deposits same upon said second conveyor belt, and a third pick up head provided with cranked arm means adjacent the other side of said second conveyor belt to enable additional bricks upon said first conveyor belt to be grasped, turned rearwardly approximately 90°, and deposited upon said second conveyor belt.

6. An article handling apparatus having a first conveyor belt and a second conveyor belt adapted to receive articles from said first conveyor belt, said second conveyor belt being positioned above and travelling transversely to said first conveyor belt, the improvement essentially consisting of a first pick up head adjacent one side of said second conveyor belt, means to enable movement of said first pick up head from a first position for receiving articles carried on said first conveyor belt to a second position above said second conveyor belt, a second pick up head to take articles from said first pick up head while the latter is in said second position, and means to lower said second pick up head to deposit articles upon said second conveyor belt, at least one of said pick up heads comprising a backing plate having deformable seal means compressible by an article to be picked up.

7. An article handling apparatus having a first conveyor belt and a second conveyor belt adapted to receive articles from said first conveyor belt, said second conveyor belt being positioned above and traveling transversely to said first conveyor belt, the improvement essentially consisting of a first pick up head adjacent one side of said second conveyor belt, means to enable movement of said first pick up head from a first position for receiving articles carried on said first conveyor belt to a second position above said second conveyor belt, a second pick up head to take articles from said first pick up head while the latter is in said second position, means to lower said second pick up head to deposit articles upon said second conveyor belt, and control means for sensing articles upon said first conveyor belt and thereupon initiating movement of said pick up heads.

References Cited by the Examiner
UNITED STATES PATENTS 2,904,192  9/1959  Reynolds.
2,997,186  8/1961  Terez.

SAMUEL F. COLEMAN, *Primary Examiner.*

EDWARD A. SROKA, *Examiner.*